United States Patent

Takahashi et al.

[11] 4,054,039
[45] Oct. 18, 1977

[54] SLIDING CONSTANT VELOCITY UNIVERSAL JOINT

[75] Inventors: Koichi Takahashi, Yokohama; Nobuteru Hitomi, Yokosuka; Taisuke Kizu, Fujisawa, all of Japan

[73] Assignee: Nissan Motor Company, Limited, Yokohama, Japan

[21] Appl. No.: 672,943

[22] Filed: Apr. 2, 1976

[30] Foreign Application Priority Data

Apr. 22, 1975   Japan ................... 50-48794

[51] Int. Cl.² .................................... F16D 3/30
[52] U.S. Cl. ............................... 64/21; 64/8
[58] Field of Search ......................... 64/21, 8, 7

[56] References Cited

U.S. PATENT DOCUMENTS

| | | | |
|---|---|---|---|
| 3,553,979 | 1/1971 | Noguchi et al. | 64/21 |
| 3,557,572 | 1/1971 | Aucktor et al. | 64/8 |
| 3,785,172 | 1/1974 | Parsons | 64/21 |
| 3,815,381 | 6/1974 | Wagner | 64/21 |

*Primary Examiner*—Samuel Scott
*Assistant Examiner*—Randall Heald
*Attorney, Agent, or Firm*—Frank J. Jordan

[57] ABSTRACT

A sliding constant velocity universal joint comprises an annular outer joint member having an axially extending portions interconnecting the adjacent two grooves of the outer member. Every axially extending portion makes a line-to-line contact with spherical outer surface portion of a ball retaining cage to provide two spaces on the opposite sides of the contacting portion of the axially extending portion.

4 Claims, 9 Drawing Figures

SLIDING CONSTANT VELOCITY UNIVERSAL JOINT

The present invention relates to a sliding constant velocity universal joint more particularly, to an outer member having an inner surface for coaction with an outer spherical surface or a spherical portion on an outer surface of a ball retaining cage.

A known form of sliding constant velocity universal joint comprises an annular outer joint member having grooves on its inner surface parallel with the axis of the joint. An inner joint member is positioned with the outer joint member and is provided with grooves on its outer surface to form pairs of opposed grooves with the grooves on the outer joint member. A ball is positioned in every pair of opposed grooves and a cage disposed between the two joint members ratains the balls in a plane perpendicular to the axis of the cage. The cage is guided within the outer joint member by a spherical portion on the outer face of the cage and is guided with respect to the inner joint member by a spherical surface portion on the inner face of the cage. The centers of the outer and inner spherical portions of the cage are equidistant on opposite sides of the plane passing through the centers of the balls. The outer spherical portion of the cage is guided on a cylindrical surface formed on the inner face of the outer joint member.

In a sliding constant velocity universal joint as described above, the outer spherical portion of the cage is guided within cylindrical bore and contacts slidably with the cylindrical surface of the outer joint member. The ball is positioned in every pair of opposed grooves of the outer and inner joint members to transmit torque. This construction has the disadvantage that because there is an area of sharp concentration of stress adjacent a leading one of both side edges of every groove of the outer joint member when torque is transmitted from the inner joint member to the outer joint member, as the torque increases, the area on the cylindrical surface which is adjacent the leading edge of every groove is likely to be deformed inwardly to form a projection which may engage with the outer spherical portion of the cage to hinder the guiding of the ball cage within the cylindrical bore. To prevent the projection from engaging firmly with the outer spherical portion of the cage, it is known to chamfer both side edges of every groove. This method is not sufficient, however. As a result, the torque transmitted by the sliding constant velocity universal joint is limited and is low.

It is therefore the principal object of the present invention to provide a sliding constant velocity universal joint which can transmit substantially higher torques with the same structual volume of the joint.

It is another object of the present invention to provide a sliding constant velocity universal joint of the above character which can be constructed from a conventional sliding constant velocity universal joint with modification of minimum number of component part of the conventional joint.

The above and other objects, features and advantages of the present invention will become clear from the following description in connection with the accompanying drawings, in which.

Figure 1:
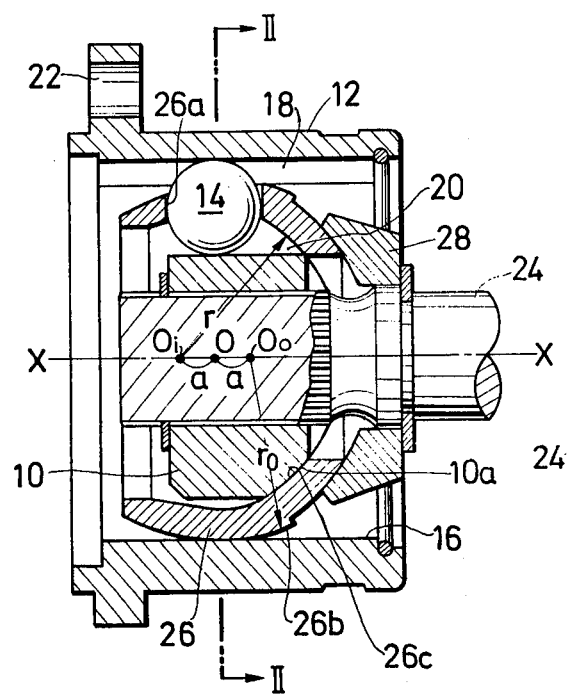
FIG. 1 is a longitudinal sectional view of a sliding joint according to the prior art and taken along the line I—I of FIG. 2.
Figure 2:
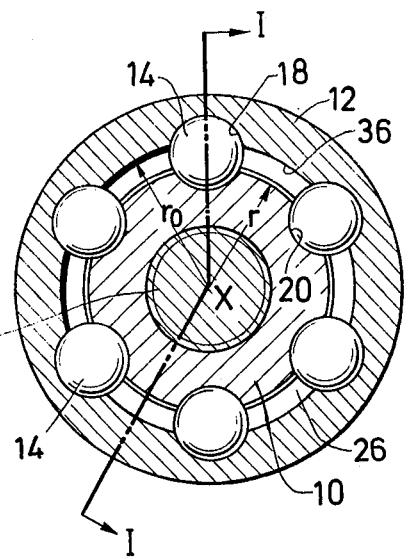
FIG. 2 is a sectional view taken along the line II—II of FIG. 1.

Referring to FIGS. 1 and 2 there is shown the sliding joint which the present invention is applied.

The sliding joint comprises an inner joint member 10 axially movable within an annular outer joint member 12 and coupled therein to a series of equiangularly spaced torque-transmitting balls 14 (see FIG. 2). The sectioning of the joint is taken in different radial planes above and below the joint axis X—X, respectively, whereby to show above that axis the sectional form of the joint components between the adjacent balls 14. The outer member 12 has an interior surface forming a cylindrical bore 16 machined with longitudinally extending grooves 18. The exterior surface of the inner member 10 is similarly machined with grooves 20. The grooves 18 and 20 cooperate in parts to provide ball tracks along which the balls 14 roll during joint articulation and plunge. At one end of the outer member 12 it has an external peripheral flange 22 which is bolted to a driven shaft (not shown), while the inner member 10 has a splined connection with a drive shaft 24 which projects from the opposite end of the outer member 12. For keeping the balls 14 in a so-called constant velocity plane, that is, a plane which passes through the instantaneous center of the joint and bisects the instantaneous drive and driven axes of the joint, the balls are closely received in respective windows 26a of a ball cage 26 which is guided by a part-spherical portion 26b on its exterior surface in the cylindrical bore 16 of the outer member 12 and by a part-spherical portion 26c on its interior surface on a part-spherical portion 10a on the exterior surface of the inner member 10. The center points of curvature 0o and 0i of the part-spherical portions 26b and 26c of the cage 26 are offset by an equal amount on the opposite sides of the joint center O along the joint axis X—X to achieve the offset effect. A restraining member 28 is provided to assist the cage 26 in preventing relative axial movement between the cage 26 and the inner member 10.

Figure 3:
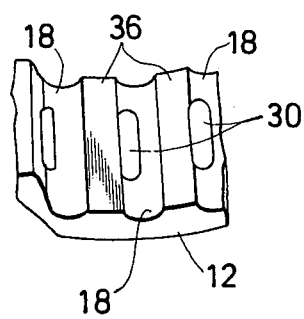
FIG. 3 is a fragmentary diagram of the outer joint member of the sliding joint of FIG. 1.
Figure 4:
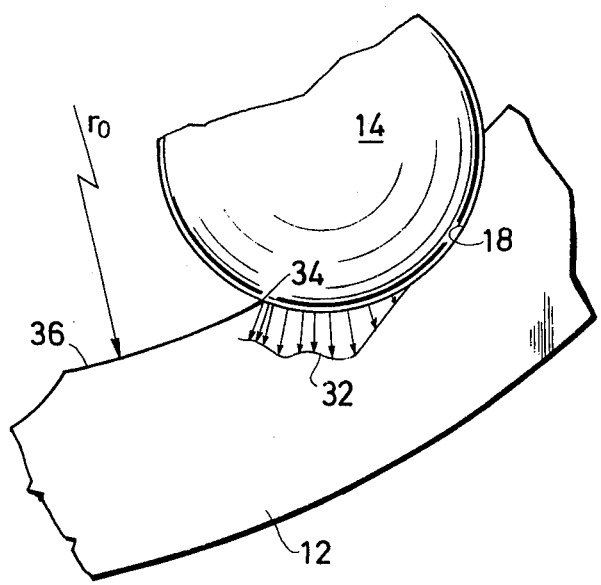
FIG. 4 is an enlarged diagram showing the stress distribution on the outer joint member.

Driving torque from the drive shaft 24 is transmitted by the grooves 20 of the inner member 10 to the balls 14 which in turn transmit the driving torque to the grooves 18 of the outer member 12. Since stress concentrates on a leading side edge, with respect to the rotation of the joint, of each of the grooves 18 of the outer member 12 during the torque transmission, an abutting mark 30 is formed in each of the grooves 18 (see FIG. 3), the abutting mark extending longitudinally along the groove. FIG. 4 illustrates an enlarged diagrammatic view of one of the balls 14 engaging in the groove 18 of the outer member 12 to show a stress distribution 32 determined with a photoelastic test.

Figure 5:
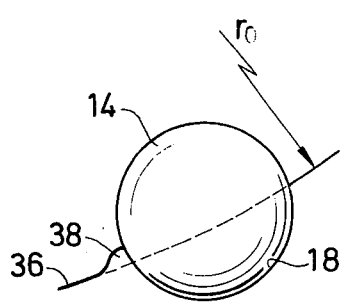
FIG. 5 is a diagram similar to FIG. 4 showing a projection resulted from the sharp stress concentration.
Figure 6:
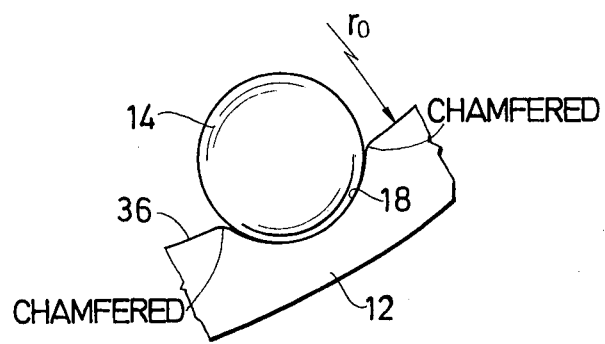
FIG. 6 is a similar view to FIG. 5 showing a groove with chamfered side edges.

When the balls 14 transmit an excessive driving torque to the grooves 18, stress will concentrate sharply on an edge designated as 34 in FIG. 4, deforming an adjacent one of cylindrical surface portions 36 on the interior surface of the outer member 12 to generate a projection 38 on the part-cylindrical portion 36 (see FIG. 5).

For the purpose of preventing the projection 38 from engaging firmly with the part-spherical portion 26b on the exterior surface of the cage 26, both side edges of each of the grooves 18 are chamfered after the grooves 18 are machined. This conventional practice is not sufficient, however to solve the problem described above.

Figure 7:
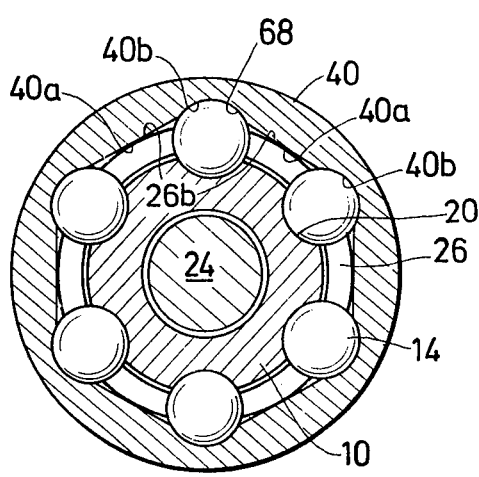
FIG. 7 is a similar view to FIG. 2 showing one embodiment of a sliding joint according to the present invention.
Figure 8:
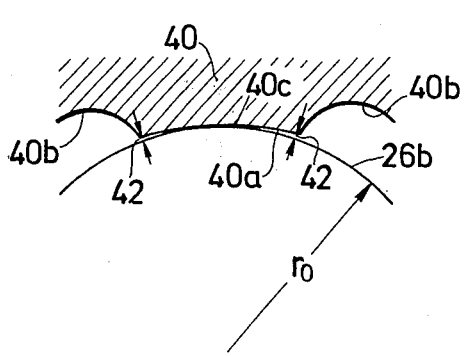
FIG. 8 is an enlarged view of a portion of the sliding joint of FIG. 7.
Figure 9:
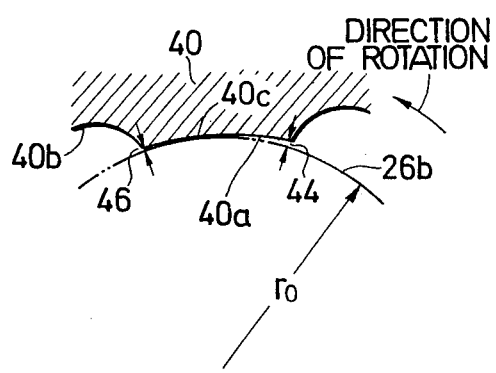
FIG. 9 is a similar view to FIG. 8 showing another embodiment of a sliding joint according to the present invention.

The present invention aims at eliminating the problem encountered in the conventional sliding joint and two embodiments according to the present invention are illustrated in FIGS. 7 through 9.

FIGS. 7 and 8 show one embodiment of a sliding joint according to the present invention, in which like reference numerals are used to designate similar parts to those of FIGS. 1 and 2 for the sake of brevity. As best seen in FIG. 8, every axially extending portion 40a of an outer joint member 40 interconnecting the adjacent two axially extending grooves 40b makes a line-to-line contact, at its intermediate portion 40c between the two grooves 40b, with a part-spherical portion 26b of a ball retaining cage 26 and two spaces 42 are provided between the portion 40a and the part-spherical portion 26b on the opposite sides of the intermediate contacting portion 40c. Each of the two spaces 42 gradually increases its spacing as the portion 40a approaches one of the adjacent two grooves 40b and provide a span, between the portions 40a and 42, wide enough for preventing engagement of a projection 38 (see FIG. 5) with the part-spherical portion 26b. In this embodiment the two spaces 42 are substantially symmetrical around the contacting portion 40c. Every axially extending portion 40a interconnecting the adjacent two grooves 40b is basically cylindrical and formed by crowing to provide the contacting portion 40c and the two spaces 42.

Referring to FIG. 9 every axially extending portion 40a of an outer joint member 40 makes a line-to-line contact with a part-spherical portion 26b of a ball retaining cage 26 and two spaces 44 and 46 are provided. The space 44 is on the side of the contacting portion 40c adjacent to a leading side edge of one groove 40b, with respect to a direction of rotation of the joint (the direction of rotation being designated by an arrow in FIG. 9), and the space 46 is on the opposite side of the contacting portion 40c adjacent to a trailing side edge of other groove 40b. The space 44 has a span wider than the space 42 so as to cope with the fact that a projection 38 (see FIG. 5) formed adjacent the leading side edge of every groove 40b is larger than a projection formed on the trailing side edge of the groove 40b because the forward direction of rotating is more frequent than the opposite direction of rotation when the joint is used in a drive line of a motor vehicle. The axially extending portion 40a may be formed by selecting a shorter radius of curvature at the left hand side, as viewed in FIG. 9, of the contacting portion 40c than that of right hand side at the contacting portion 40c after displacing the contacting portion 40c from the center leftwardly to the position illustrated in FIG. 9.

What is claimed is:

1. A sliding constant velocity universal joint comprising:
    an outer member having an interior surface defining an axial bore having a plurality of axially extending portions and a plurality of axially extending grooves corresponding in number to the plurality of axially extending portions, each of said grooves being located between two adjacent axially extending portions;
    a ball retaining cage within said axial bore, said cage having an exterior surface;
    an inner member within said ball retaining cage having a plurality of grooves corresponding in number to the grooves in said outer member; and
    a plurality of balls corresponding in number to the grooves in said outer member, each of said balls being retained by said ball retaining cage and being mounted between a respective one of said grooves in said outer member and a respective one of said grooves in said inner member;
    each of said axially extending portions having an intermediate axially extending section which makes contact with said exterior surface of said ball cage to provide two spaces between said exterior surface of the ball cage and the axially extending portions on opposite sides of the intermediate section.

2. A sliding constant velocity universal joint as claimed in claim 1, in which the two spaces on the opposite sides of the intermediate section are symmmetrical around the intermediate section.

3. A sliding constant velocity universal joint as claimed in claim 1, in which one of the two spaces on the opposite sides of the intermediate section which is adjacent a leading side edge of one of the adjacent two grooves has a wider span than the other one of the two spaces which is adjacent a trailing side edge of the other one of the adjacent two grooves.

4. A sliding constant velocity universal joint comprising:
    an outer member having an interior surface defining an axial bore having a plurality of axially extending grooves and a plurality of axially extending bridge portions corresponding in number to the plurality of axially extending grooves, each of said plurality of axially extending bridge portions extending between the adjacent two of said axially extending grooves;
    a ball cage within said axial bore, said ball cage having a curved exterior surface;
    an inner member within said cage having a plurality of grooves corresponding in number to the grooves in said outer member; and
    a plurality of balls corresponding in number to the plurality of grooves in said outer member, each of said balls being retained by said ball cage and being mounted between a respective one of said grooves in said outer member and a respective one of said grooves in said inner member to transmit a torque from said inner member to said outer member;
    each of said plurality of axially extending bridge portions making contact with the exterior surface of said ball cage at an intermediate section of the bridge portion to provide two spaces between the exterior surface of said ball cage and said bridge portion on the opposite sides of the intermediate section, the intermediate section of each of said plurality of axially extending bridge portions being intermediate the adjacent two of said plurality of axially extending grooves of said outer member;

each of said plurality of axially extending grooves in said outer member having two groove edges where the latter grooves intersect the bridge portion of said outer member, said plurality of axially extending grooves of said outer member being of a size such that, upon transmission of a torque from said inner member to said outer member through said balls, one of said two groove edges of each of said plurality of axially extending grooves will abut one of said balls.

* * * * *